United States Patent
Hohm et al.

(10) Patent No.: US 11,532,845 B2
(45) Date of Patent: Dec. 20, 2022

(54) BATTERY CELL

(71) Applicant: VOLKSWAGEN AKTIENGESELLSCHAFT, Wolfsburg (DE)

(72) Inventors: Volker Hohm, Destedt (DE); Bastian Schaar, Braunschweig (DE); Frank Wesche, Velpke (DE); Joerg Kaufmann, Isenbuettel (DE); Helge Herten, Wolfenbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 258 days.

(21) Appl. No.: 16/673,091

(22) Filed: Nov. 4, 2019

(65) Prior Publication Data
US 2020/0144685 A1  May 7, 2020

(30) Foreign Application Priority Data
Nov. 5, 2018 (DE) ...................... 10 2018 127 476.9

(51) Int. Cl.
*H01M 10/643* (2014.01)
*H01M 10/613* (2014.01)
*H01M 10/653* (2014.01)
*H01M 50/20* (2021.01)

(52) U.S. Cl.
CPC ....... *H01M 10/643* (2015.04); *H01M 10/613* (2015.04); *H01M 10/653* (2015.04); *H01M 50/20* (2021.01)

(58) Field of Classification Search
CPC ............ H01M 10/643; H01M 10/613; H01M 10/653; H01M 50/20; H01M 10/0431; H01M 10/654; H01M 10/0422; H01M 10/617; H01M 10/625; H01M 2220/20; Y02E 60/10; Y02P 70/50; Y02T 10/70; B60L 50/64; B60L 50/66; B60L 58/26
See application file for complete search history.

(56) References Cited

U.S. PATENT DOCUMENTS

| | | | |
|---|---|---|---|
| 10,044,014 B2 | 8/2018 | Kaiser et al. | |
| 10,355,261 B2 | 7/2019 | Drings | |
| 2011/0305932 A1* | 12/2011 | Doshi | H01M 10/654 429/94 |
| 2012/0077095 A1* | 3/2012 | Roumi | H01M 4/664 429/405 |
| 2013/0101882 A1 | 4/2013 | Ogg et al. | |

FOREIGN PATENT DOCUMENTS

| | | |
|---|---|---|
| CN | 101743653 A | 6/2010 |
| CN | 202 444 033 U | 9/2012 |
| CN | 106463653 A | 2/2017 |
| CN | 106463660 A | 2/2017 |
| CN | 206225503 U | 6/2017 |
| DE | 25 03 897 A1 | 8/1976 |
| DE | 25 03 897 B2 | 7/1977 |
| DE | 10 2014 206 832 A1 | 10/2015 |
| JP | 2000048825 A | 2/2000 |
| JP | 2008135312 A | 6/2008 |
| JP | 2011165483 A | 8/2011 |

OTHER PUBLICATIONS

Search report for German Patent Application No. 10 2018 127 476.9, dated May 31, 2019.
Search report for European Patent Application No. EP 19 20 7154, dated Apr. 2, 2020.
Office Action for Chinese Patent Application 201911065448.0. dated Sep. 20, 2022.

* cited by examiner

*Primary Examiner* — Muhammad S Siddiquee
(74) *Attorney, Agent, or Firm* — Pearl Cohen Zedek Latzer Baratz LLP

(57) ABSTRACT

A battery cell in the form of a round cell, having: at least one electrode element having an inner side and an outer side and at least one temperature control element, wherein the inner side of the at least one electrode element is spaced apart, at least in sections, from the outer side of the at least one electrode element by means of the temperature control element.

14 Claims, 4 Drawing Sheets

BATTERY CELL

CROSS-REFERENCE TO RELATED APPLICATIONS

This application claims priority from German Patent Application No. 10 2018 127 476.9, filed Nov. 5, 2018, which is hereby incorporated by reference.

FIELD OF THE INVENTION

The invention relates to a battery cell in the form of a round cell and to a method for manufacturing a battery cell in the form of a round cell.

BACKGROUND OF THE INVENTION

In the development of batteries, the aim is a design in which the volume of the battery and individual battery cells is as large as possible and the housing is as small as possible, so that all occurrences of mechanical load can be withstood without fires or short circuits. To achieve the maximum power density and energy density, the structural components must have a space-saving design and preferably no redundancies. At the same time, in addition to the installation space for the battery cells, sufficient installation space must be reserved inside the housing for the electrical lines and control units. In turn, the battery cells must have the best possible thermal contact with the cooling device. Age-related expansion effects, so-called swelling, must likewise be taken into account. Battery cells in the form of round cells have advantages with regard to swelling. On the other hand, a disadvantage with the round cells is that the geometry of the battery cells is subject to limitations. The metallic housing of the round cells is manufactured using a deep drawing process, resulting in a cylindrical housing having a monolithically connected base. The ratio of the length to the radius is adjustable only to a limited extent. A large number of fairly small round cells requires a large peripheral area for fastening, electrical wiring, cooling, etc., so that it is difficult to make good use of the limited installation space. In turn, a small number of fairly large round cells has the disadvantage that uniform cooling of the larger round cells is problematic.

The object of the invention, therefore, is to provide an improved battery cell, for example a battery having a modular design, in particular for HV applications in electric vehicles. In particular, the object of the invention is to provide an economical battery that has a simple design and a reduced-weight battery cell, allows uniform cooling, and has optimized, preferably enlarged, dimensions. A further object of the invention is to provide an improved method for manufacturing a battery cell in the form of a round cell in a simple, quick, and cost-effective manner.

SUMMARY OF THE INVENTION

The object according to the invention is achieved by a battery cell having the features of the independent device claim, and by a method for manufacturing a battery cell in the form of a round cell, having the features of the independent method claim. Preferred refinements of the invention are set forth in the dependent claims. Features that are disclosed with respect to the individual aspects of the invention may be combined with one another in such a way that with regard to the disclosure, mutual reference is or may always be made to the individual aspects of the invention.

The invention provides a battery cell in the form of a round cell, having: at least one electrode element having an inner side and an outer side and at least one temperature control element, wherein the inner side of the at least one electrode element is spaced apart, at least in sections, from the outer side of the at least one electrode element by means of the temperature control element.

The battery cell may have at least one electrode element. That is, only one, for example strip-shaped, electrode element may be provided which may be wound to form a winding, or multiple, for example cylinder shell-shaped, electrode elements which may be situated coaxially with respect to one another and plugged into one another. The at least one electrode element, whether only a single wound electrode element, or each of multiple electrode elements, in each case has an outer side and an inner side. When there is only one electrode element, this corresponds to only one outer side and only one inner side. For multiple electrode elements, in each case there is an outer side and an inner side on each electrode element. For only one electrode element, the temperature control element, which is likewise strip-shaped, for example, is wrapped between the individual layers. In this way, the temperature control element separates the outer side of one winding layer from the inner side of a winding layer of the single electrode element that is wound onto the one winding layer. For multiple electrode elements, the at least one temperature control element is situated between two adjacent electrode elements. In this way, the at least one temperature control element comes into contact between the outer side of one electrode element and the inner side of a next electrode element.

According to the invention, a round cell having arbitrary dimensions is provided which is uniformly temperature-controlled. The inventive concept lies in the fact that within the round cell, the layers containing cell material (formed by the at least one electrode element) and cooling levels (formed by the at least one temperature control element) alternate continuously, and thus fill the housing, completely if desired. The electrical wiring and the connections to the cooling (routing) take place at the end-face surfaces of the round cells. The cruising range or the power of the battery cell may be controlled and/or varied by removing individual layers of cell material, and optionally cooling levels. This results in a cavity in the core of the round cell. For supporting the round cell starting from the core, one or more packing materials may be provided which protect the remaining electrode elements in the battery cell.

The battery cell according to the invention may advantageously be used for HV applications, for example in electric vehicles. Round cells having a comparable size may be provided, whose length may advantageously utilize the available installation space in the transverse vehicle direction. Such battery cells may similarly be installed in the transverse vehicle direction. Optimal use may thus be made of the available installation space in the vehicle. At the same time, with one or more of such battery cells the weight of the battery is reduced, since fewer components are needed for fastening, electrical wiring, cooling, etc. The at least one temperature control element according to the invention allows homogeneous cooling over a radius, preferably of any given size, and a round cell, preferably of any given height. No additional measures for swelling are necessary, since this function is already performed by the round cell. In addition, the round cell according to the invention is easy and cost-efficient to manufacture.

In addition, for a battery cell the invention may provide that the at least one electrode element includes at least two electrode elements, for example a first electrode element and a second electrode element. A plug-in system may thus be provided.

Within the scope of the invention, it is conceivable for the at least one temperature control element to be situated between the inner side of a first electrode element and the outer side of a second electrode element. The at least one temperature control element may thus be situated between the at least two electrode elements, and the electrode elements uniformly control the temperature over their planar extent (cylinder shell surface), and not just at the base, as is currently the case with the known round cells.

Furthermore, for a battery cell the invention may provide that only one electrode element is provided, which is wrapped to form a winding. The manufacture of the battery cell may be greatly simplified in this way.

Within the scope of the invention, it is conceivable for the at least one temperature control element to be wrapped between the inner side of the electrode element and the outer side of the same electrode element. The temperature control element can thus uniformly and flatly contact the entire electrode element. In addition, the temperature control element can thus contact the electrode element on both sides in each winding layer.

Moreover, for a battery cell the invention may provide that the at least one electrode element has a strip-shaped design. The manufacture of the electrode may thus be simplified, and a battery cell may be provided that has an enlarged active surface.

In addition, for a battery cell the invention may provide that the at least one temperature control element has a strip-shaped design. The manufacture of the temperature control element may thus be simplified.

Within the scope of the invention, the at least one temperature control element may be designed in the form of a cooling element that is electrically switchable, for example, and/or a cooling conduit through which a cooling medium flows. Flexibility may thus be provided in the selection and control of the temperature control element. An electrically switchable cooling element may be controlled more quickly. A cooling conduit through which a cooling medium flows may be connected to a vehicle radiator and/or a heat exchanger, and may thus be functionally integrated into a vehicle-side cooling device for the electric motor and/or into an air conditioner for the vehicle interior.

In addition, for a battery cell the invention may provide that a housing for the battery cell is provided. The housing may be advantageous for protecting the battery cell from mechanical influences and soiling. The housing may be advantageously designed with a greater wall thickness in order to be able to absorb high loads and preferably transmit them to the vehicle body. This allows additional system components to be spared, and at the same time results in efficient utilization of installation space and a low weight of the battery cell, with an increased energy content of the battery cell.

Furthermore, for a battery cell the invention may provide that the outer side of the at least one electrode element is spaced apart from the housing, at least in sections, by means of the at least one temperature control element. The outermost layer of the at least one electrode element may thus be temperature-controlled just as uniformly as the interior layers.

Moreover, for a battery cell the invention may provide that the at least two electrode elements form a plug-in system. It is thus possible to variably adapt the cruising range and the power of the battery cell.

Furthermore, for a battery cell the invention may provide that the at least two electrode elements have a cylinder shell-shaped design and/or are situatable coaxially with respect to one another. The at least two electrode elements may thus be positioned relative to one another in a space-saving manner. In addition, the bearing of multiple electrode elements may thus be simplified.

In addition, within the scope of the invention it is conceivable for the at least two electrode elements to have different diameters. The at least two electrode elements may thus be situated one inside the other.

Moreover, for a battery cell the invention may provide that the at least one temperature control element includes at least two temperature control elements. In the case of multiple electrode elements, each of at least two temperature control elements may be situated between two adjacent electrode elements.

Furthermore, for a battery cell the invention may provide that the at least two temperature control elements have a cylinder shell-shaped design and/or are coaxially situatable with respect to one another. In this way, the at least two temperature control elements may be positioned relative to one another in a space-saving manner. In addition, the bearing and the connection of multiple temperature control elements may thus be simplified.

In addition, for a battery cell the invention may provide that the at least two temperature control elements have different diameters. The at least two temperature control elements may thus be situated one inside the other.

Moreover, for a battery cell the invention may provide at least one tubular or cylindrical packing material filling bodies on which the at least one electrode element is situated. A hollow packing material filling body may thus be situated in the core of the battery cell which protects and supports the battery cell from the inside, and allows simple bearing of the battery, for example on a bearing pin. In addition, with the aid of the least one packing material filling body, an electrode core and optionally further electrode elements may be replaced to allow the cruising range and the power of the battery cell to be adapted.

Furthermore, for a battery cell the invention may provide that the inner side of the at least one electrode element is spaced apart, at least in sections, from the at least one packing material by means of the at least one temperature control element. The innermost layer of the at least one electrode element may thus be temperature-controlled just as uniformly as the layers above it.

In addition, for a battery cell the invention may provide that the at least one packing material includes at least two packing materials having different diameters, on which a scalable number of the at least two electrode elements may be situated. An adaptable plug-in system may thus be provided. In this way, systems having different power levels may be offered for sale which are upgraded over time. At the same time, such a system with all its plug-in parts may be intentionally used to avoid wear and aging of the cells. It is conceivable that smaller battery cells may be advantageous for shorter travel distances. Since such smaller battery cells have less weight, energy costs for moving the weight of the battery cell may be reduced. In addition, such smaller battery cells can be charged more quickly. For longer travel distances, battery cells that are completely filled with electrode elements may be advantageous to achieve a greater cruising range of the electric vehicle.

In addition, the object according to the invention is achieved by a method for manufacturing a battery cell in the form of a round cell, which may in particular be designed as described above, having at least one step:

Positioning at least one temperature control element on at least one electrode element of the battery cell in such a way that an inner side of the at least one electrode element is spaced apart, at least in sections, from an outer side of the at least one electrode element by means of the temperature control element.

By use of the method according to the invention, the same advantages are achieved as those described above in conjunction with the battery cell according to the invention. Reference to these advantages is made here in full.

Furthermore, a method within the meaning of the invention may have at least one further step:

Plugging together at least two electrode elements, so that the at least one temperature control element is situated between the inner side of a first electrode element and the outer side of a second electrode element.

A plug-in system may thus be provided which can be flexibly assembled and has uniform cooling of all electrode elements as plug-in elements.

Moreover, a method within the meaning of the invention may have at least one further step:

Winding only one electrode element, so that the at least one temperature control element is wrapped between the inner side of the electrode element and the outer side of the same electrode element.

An advantageous, rapid method for manufacturing a battery cell with homogeneous cooling may thus be provided.

In addition, a method within the meaning of the invention may have at least one further step:

Providing at least two packing materials having different diameters, and/or

Inserting at least one of the two packing materials instead of a cylindrical electrode core and/or instead of at least one of the at least two electrode elements.

An adaptable and/or intentionally usable and/or upgradable plug-in system may be provided in this way.

BRIEF DESCRIPTION OF THE DRAWINGS

Further measures that enhance the invention are explained in greater detail below with the description of the preferred exemplary embodiments of the invention, with reference to the figures. The features mentioned in the claims and in the description may in each case be essential to the invention, alone or in any combination. It is noted that the figures are only descriptive in nature, and are not intended to limit the invention in any way. In the figures:

DETAILED DESCRIPTION OF THE INVENTION

FIGS. 1 through 5 show a battery cell 100 in the form of a round cell. The battery cell 100 has at least one electrode element 10 with an inner side I and an outer side A, and at least one temperature control element 20. According to the invention, it is provided that the inner side I of the at least one electrode element 10 is spaced apart, at least in sections, from the outer side A of the at least one electrode element 10 by means of the temperature control element 20.

Figure 2:
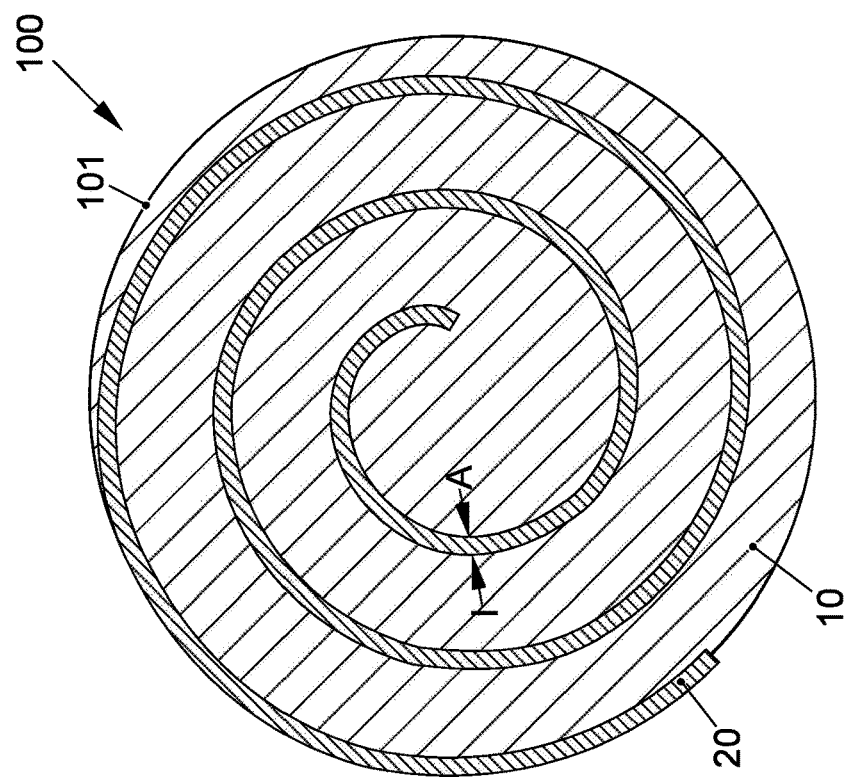
FIG. 2 shows a schematic illustration of a battery cell according to the invention according to another possible embodiment.
Figure 1:
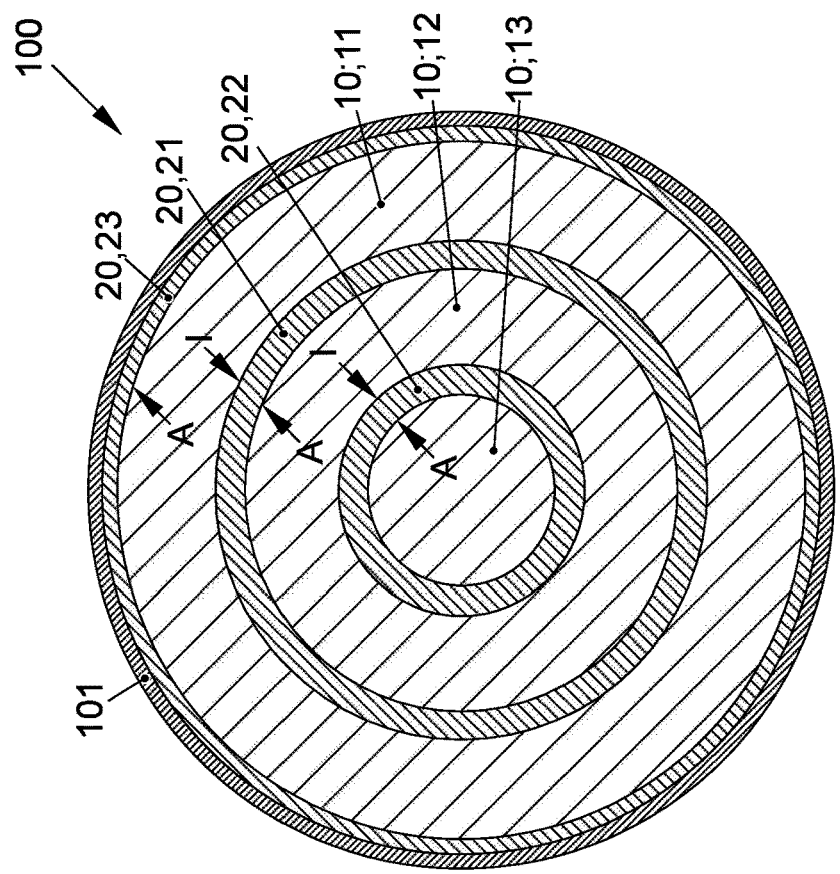
FIG. 1 shows a schematic illustration of a battery cell according to the invention according to one possible embodiment.

The battery cell 100 according to all of FIGS. 1 through 5 has at least one electrode element 10. In the embodiment in FIG. 2, the battery cell 100 may have only one, preferably strip-shaped, electrode element 10 that can be wound up to form a winding. In the embodiment in FIG. 1, the battery cell 100 may have multiple, preferably cylinder shell-shaped, electrode elements 10 that can be plugged into one another. A first electrode element 11, a second electrode element 12, and an electrode core 13 may be provided. Of course, multiple electrode elements 10 are likewise conceivable. FIGS. 1 and 2 each show a cross section of the battery cell 100 according to the invention.

The at least one electrode element 10, whether only a single wound electrode element, or each of multiple electrode elements 10, in each case has an outer side A and an inner side I. When there is only one electrode element 10 (according to FIG. 2), this corresponds to only one continuous outer side A and only one continuous inner side I. For multiple electrode elements 10 (according to FIG. 1), in each case there is an outer side A and an inner side I on each electrode element 10.

For only one electrode element 10 according to FIG. 2, the temperature control element 20, which is likewise strip-shaped, for example, is wrapped between the individual layers. In this way, the temperature control element 20 separates the outer side A of one winding layer from the inner side I of a winding layer of the single electrode element 10 that is wound onto the one winding layer.

For multiple electrode elements 10 according to FIG. 1, the at least one temperature control element 20 is situated between two adjacent electrode elements 10. In this way, the at least one temperature control element 20 comes into contact between the outer side A of one electrode element 10 and the inner side I of a next electrode element 10. In FIG. 1, a first temperature control element 21 is situated between the inner side I of the first electrode element 11 and the outer side A of the second electrode element 12. In addition, a second temperature control element 22 is situated between the inner side I of the second electrode element 12 and the outer side A of the electrode core 13. Furthermore, a third temperature control element 23 is situated between a housing 101 and the outer side A of the first electrode element 11.

Such positioning of the at least one temperature control element 20 ensures homogeneous temperature control of a round cell having any given dimensions. Within the round cell according to the invention, the layers containing cell material (formed by one or more electrode elements 10) and cooling levels (formed by one or more temperature control elements 20) advantageously alternate continuously. The housing may thus be filled, completely if desired (see FIGS. 1 and 3).

The temperature control element 20 may be designed in the form of a cooling element that is electrically switchable, for example, and/or a cooling conduit through which a cooling medium flows. Flexibility may thus be provided in the selection and control of the temperature control element 20. An electrically switchable cooling element may be controlled more quickly. A cooling conduit through which a cooling medium flows may advantageously be integrated into a vehicle-side cooling device for the electric motor and/or into an air conditioner for the vehicle interior.

Figure 3:
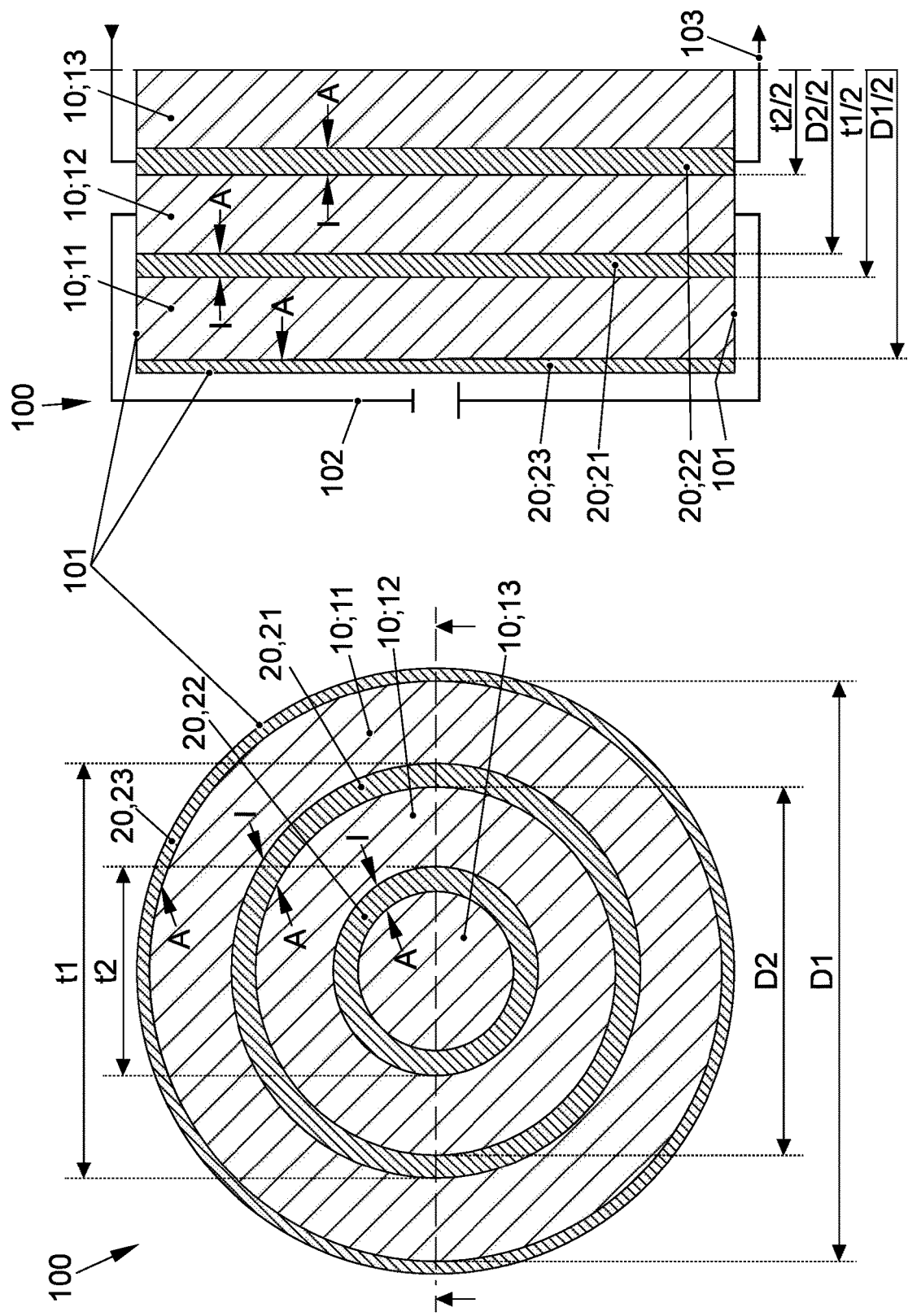
FIG. 3 shows a schematic illustration of a battery cell according to the invention in the form of a plug-in system.
Figure 4:
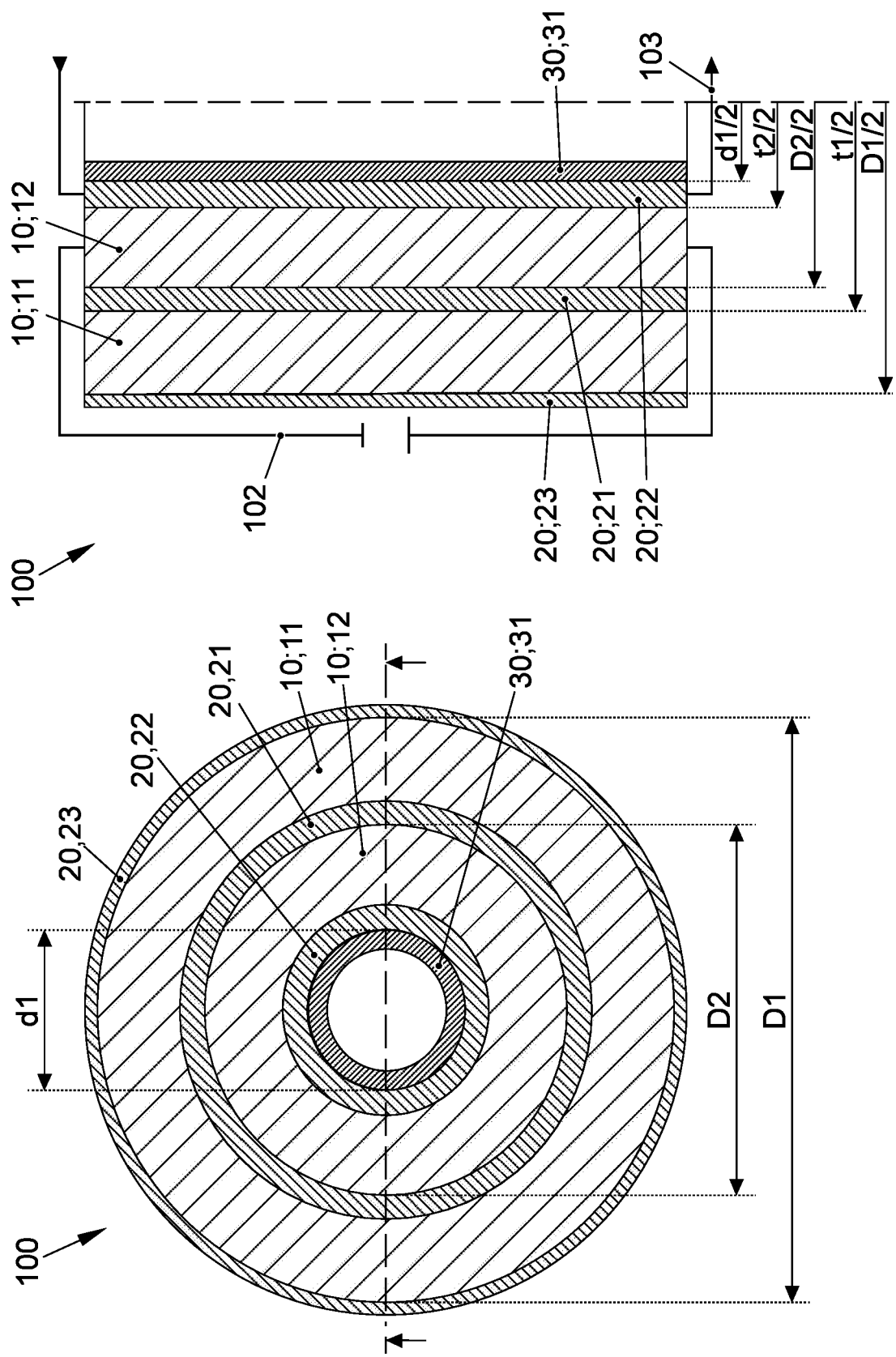
FIG. 4 shows a schematic illustration of a battery cell according to the invention in the form of a plug-in system with a possible packing material.
Figure 5:
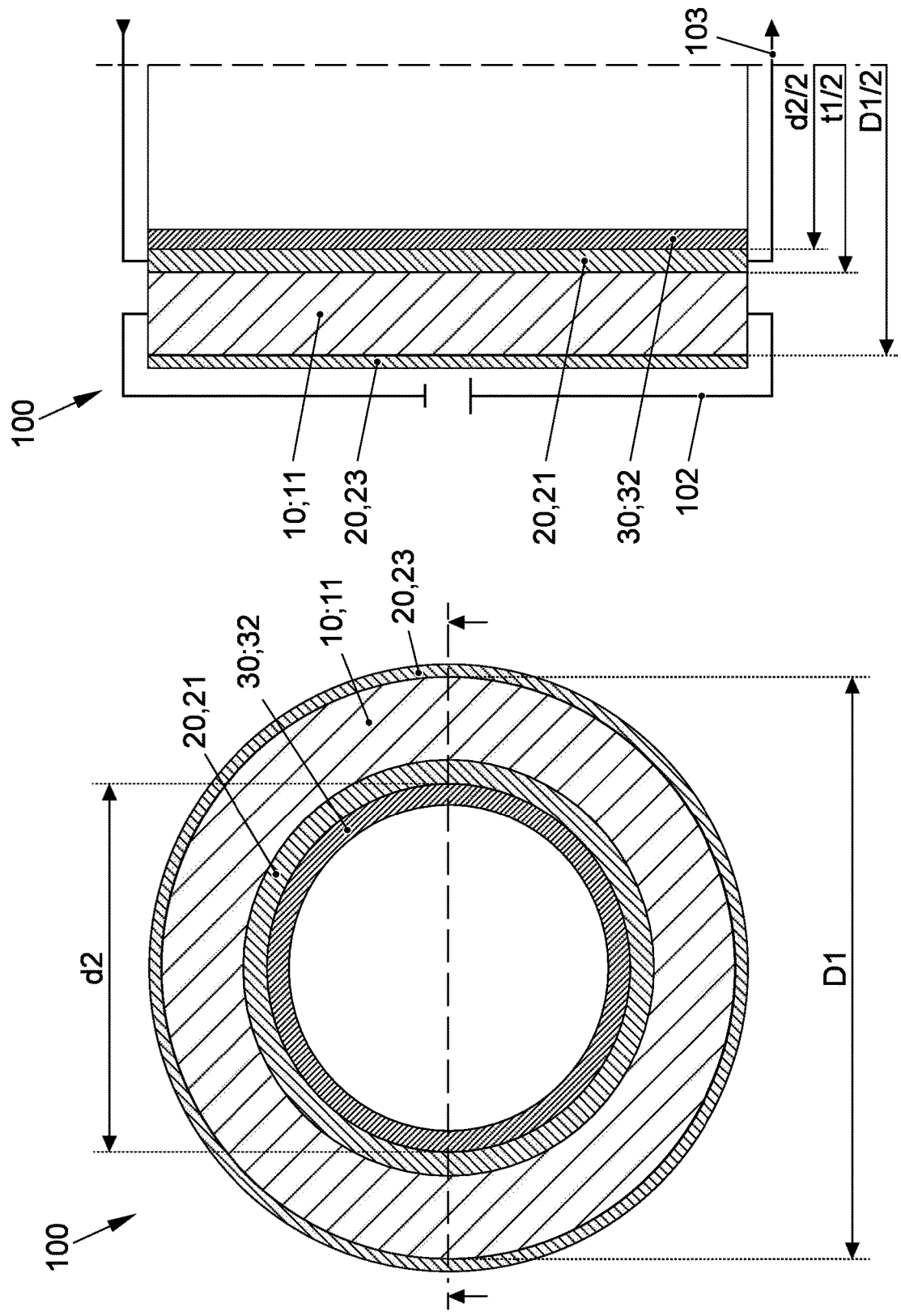
FIG. 5 shows a schematic illustration of a battery cell according to the invention in the form of a plug-in system with another possible packing material.

As indicated in FIGS. 3 through 5, the connections for the electrical wiring 102 and for the cooling 103 are established at the end-face surfaces of the round cells.

FIGS. 4 and 5 show that the cruising range or the power of the battery cell 100 may be controlled and/or varied by removing individual layers of cell material and optionally individual cooling levels. For supporting the round cell starting from the core, one or more packing materials 30 may be provided which protect and support the remaining electrode elements 10 in the battery cell 100 in the core of the round cell.

The battery cell 100 according to the invention may advantageously be used for HV applications, for example in electric vehicles. Round cells having a comparable size may be provided, which may be installed lengthwise in the transverse vehicle direction.

The housing 101 for the battery cell 100 may be designed as a load housing having an increased wall thickness in order to absorb high loads and/or transmit them to the vehicle body. The housing 101 may preferably be manufactured using a deep drawing process, and may have a cylinder shell shape with a monolithically connected base. The housing 101 may also have a cover (not illustrated) that is closable, for example. Appropriate connections for the electrical wiring 102 and for the cooling 103 may be provided on the base and/or on the cover of the housing 101.

FIGS. 3, 4, and 5 show that the at least two electrode elements 11, 12 may form a plug-in system to allow variable adaptation of the cruising range and power of the battery cell 100. FIGS. 3 through 5 show a cross section on the left side, and a longitudinal section of the particular battery cell 100 on the right side.

FIGS. 3 through 5 show that the at least two electrode elements 11, 12 and the at least two temperature control elements 21, 22 have a cylinder shell-shaped design and/or are situatable coaxially with respect to one another, so that they may preferably contact one another without play. The heat transfer for controlling the temperature of the at least two electrode elements 11, 12 takes place via the preferably play-free contact of the at least two electrode elements 11, 12 with the at least two temperature control elements 21, 22.

The at least two electrode elements 11, 12 have different diameters D1, D2. The at least two temperature control elements 21, 22 likewise have different diameters t1, t2.

FIGS. 4 and 5 show that for a battery cell 100, at least one tubular (or hollow) or cylindrical (monolithic) packing material 30 may be provided, on which the at least one electrode element 10 may be situated.

FIG. 4 shows a first packing material filling body 31 that replaces the electrode core 13. FIG. 5 shows a second packing material filling body 32 that replaces the electrode core 13 and the second electrode element 12.

The at least two packing material filling bodies 31, 32 have different diameters d1, d2. An adaptable plug-in system may be provided by means of the at least one packing material 30.

The above discussion of the figures describes the present invention solely by use of examples. Of course, individual features of the embodiments may be freely combined with one another, provided that this is technically meaningful, without departing from the scope of the invention.

LIST OF REFERENCE NUMERALS 10 electrode element
11 electrode element, first electrode element
12 electrode element, second electrode element
13 electrode element, electrode core
20 temperature control element
21 temperature control element, first temperature control element
22 temperature control element, second temperature control element
23 temperature control element, third temperature control element
30 packing material
   31 packing material, first packing material filling body
   32 packing material, second packing material filling body
100 battery cell
101 housing
102 electrical wiring
103 cooling
A outer side
I inner side
D1 diameter
D2 diameter
d1 diameter
d2 diameter
t1 diameter
t2 diameter

The invention claimed is:

1. A battery cell in the form of a round cell, having:
at least one electrode element having an inner side and an outer side and at least one temperature control element,
wherein the inner side of the at least one electrode element is spaced apart, at least in sections, from the outer side of the at least one electrode element by means of the temperature control element,
wherein a plurality of electrode elements are provided to form a plug-in system, and wherein a plurality of tubular or cylindrical packing material filling bodies are provided, so that a scalable number of electrode elements can be arranged on an outer side of a corresponding packing material filling body in order to provide an adaptable plug-in system, and in order to enable variable adaptation of the range and the power of the battery cell, and
wherein the inner side of the at least one electrode element is spaced from the outer side of a corresponding packing material filling body, at least in sections, by means of the at least one temperature control element.

2. The battery cell according to claim 1, wherein
the at least one electrode element includes at least two electrode elements, and/or
the at least one temperature control element is situated between the inner side of a first electrode element and the outer side of a second electrode element.

3. The battery cell according to claim 1, wherein
only one electrode element is provided, which is wound to form a winding, and/or
the at least one temperature control element is wrapped between the inner side of the electrode element and the outer side of the same electrode element.

4. The battery cell according to claim 1, wherein
the at least one electrode element has a strip-shaped design, and/or
the at least one temperature control element has a strip-shaped design.

5. The battery cell according to claim 1, wherein the at least one temperature control element is designed in the form of a cooling element and/or a cooling conduit through which a cooling medium flows.

6. The battery cell according to claim 1, wherein
a housing for the battery cell is provided, and/or the outer side of the at least one electrode element is spaced apart, at least in sections, from the housing by means of the at least one temperature control element.

7. The battery cell according to claim 2, wherein the at least two electrode elements have a cylinder shell-shaped design and/or are situatable coaxially with respect to one another, and/or the at least two electrode elements have different diameters.

8. The battery cell according to one claim 1, wherein the at least one temperature control element includes at least two temperature control elements.

9. The battery cell according to claim 8, wherein
the at least two temperature control elements have a cylinder shell-shaped design and/or are situatable coaxially with respect to one another, and/or
the at least two temperature control elements have different diameters.

10. The battery cell according to claim 1, wherein the at least one packing material filling body includes at least two packing material filling bodies having different diameters, on which a scalable number of the at least two electrode elements may be situated.

11. A method for manufacturing the battery cell in the form of a round cell according to claim 1, comprising:

positioning the at least one temperature control element on at least one electrode element of the battery cell in such a way that the inner side of the at least one electrode element is spaced apart, at least in sections, from the outer side of the at least one electrode element by means of the temperature control element.

12. The method according to claim 11, further comprising:
plugging together at least two electrode elements, so that the at least one temperature control element is situated between the inner side of a first electrode element and the outer side of a second electrode element.

13. The method according to claim 11, further comprising:
winding only one electrode element, so that the at least one temperature control element is wrapped between the inner side of the electrode element and the outer side of the same electrode element.

14. The method according to claim 11, further comprising: providing at least two packing materials having different diameters, and/or inserting at least one of the two packing materials instead of a cylindrical electrode core and/or instead of at least one of the at least two electrode elements.

* * * * *